(12) United States Patent
Bibow

(10) Patent No.: US 9,027,785 B1
(45) Date of Patent: May 12, 2015

(54) TANK HOLDING DEVICE

(71) Applicant: Christoper W. Bibow, Norwalk, CT (US)

(72) Inventor: Christoper W. Bibow, Norwalk, CT (US)

( * ) Notice: Subject to any disclaimer, the term of this patent is extended or adjusted under 35 U.S.C. 154(b) by 0 days.

(21) Appl. No.: 14/200,071

(22) Filed: Mar. 7, 2014

Related U.S. Application Data

(60) Provisional application No. 61/851,528, filed on Mar. 11, 2013.

(51) Int. Cl.
  *B65D 25/00* (2006.01)
  *B44D 3/14* (2006.01)
  *A47G 23/02* (2006.01)

(52) U.S. Cl.
  CPC . *B65D 25/00* (2013.01); *B44D 3/14* (2013.01); *A47G 2023/0283* (2013.01); *A47G 23/0216* (2013.01)

(58) Field of Classification Search
  CPC ............ A47G 23/02; A47G 223/0208; A47G 23/0216; A47G 2023/0275; A47G 2023/0283; A47G 19/22; B44D 3/14; B65D 81/261; A01G 9/04
  USPC ........... 220/737, 738, 23.89, 23.87, 501, 571, 220/572, 571.1
  See application file for complete search history.

(56) References Cited

U.S. PATENT DOCUMENTS

| | | | | |
|---|---|---|---|---|
| 435,148 | A * | 8/1890 | Mansfield | 220/572 |
| 559,358 | A * | 5/1896 | Burt | 47/50 |
| 2,212,749 | A * | 8/1940 | Pelouch | 222/609 |
| 6,079,587 | A * | 6/2000 | Vogt | 220/571 |

* cited by examiner

*Primary Examiner* — Stephen Castellano
(74) *Attorney, Agent, or Firm* — Edward P Dutkiewicz

(57) ABSTRACT

A tank holding device, comprising a base plate and a cylinder containment portion. The cylinder containment portion being fixedly coupled to the base plate. There is at least one drain hole which is located at the joining of the cylinder containment portion and the base plate. The drain hole is angled upward and inward. The drain hole forms an outwardly and downwardly draining trough.

8 Claims, 4 Drawing Sheets

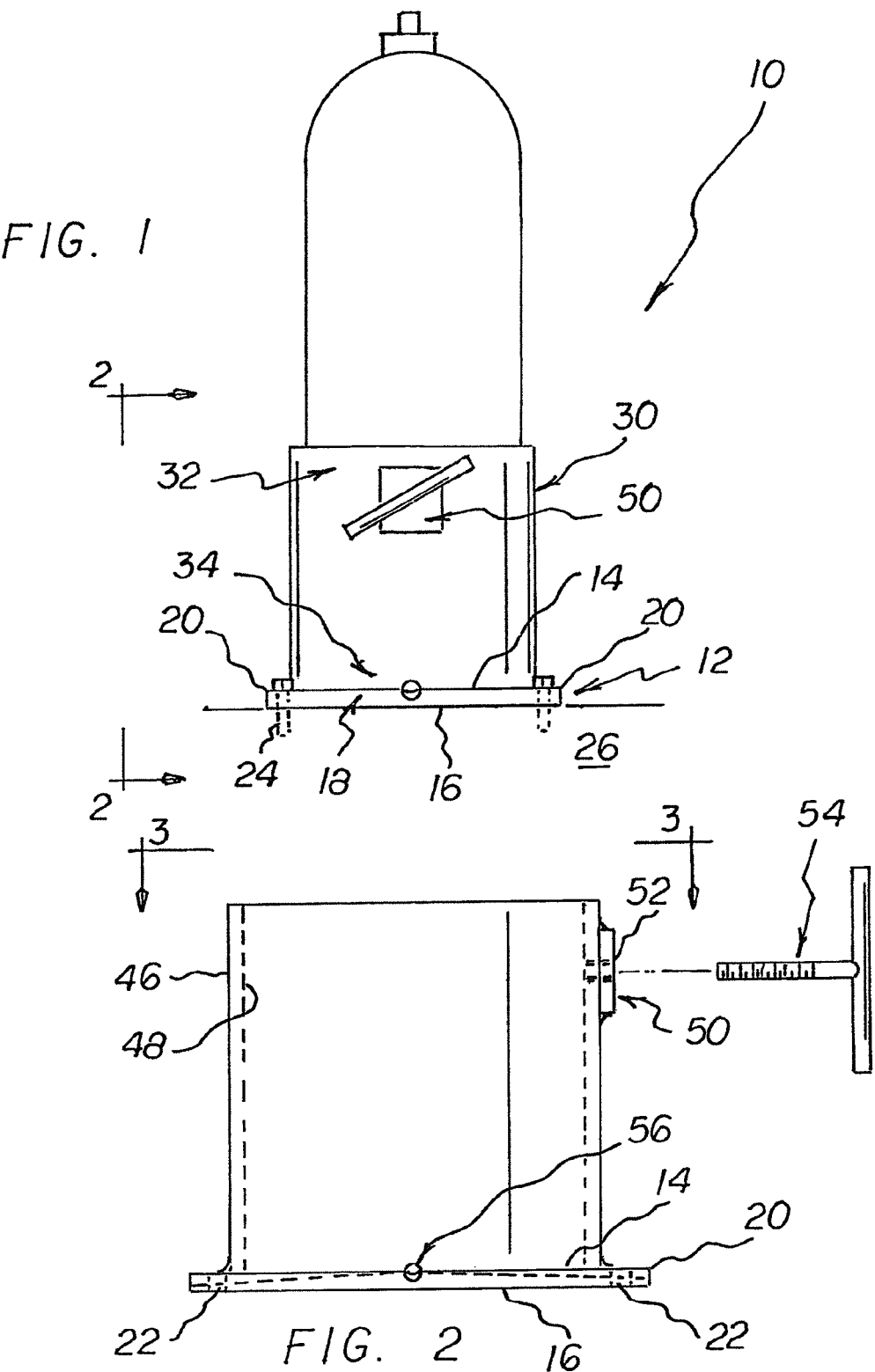

TANK HOLDING DEVICE

CLAIM OF PRIORITY

This application is a continuation-in-part of a provisional application, bearing Ser. No. 61/851,528, which was filed on Mar. 11, 2013. This application claims the priority date of the filed parent provisional application.

RULE 1.78(F)(1) DISCLOSURE

The Applicant has not submitted a related pending or patented non-provisional application within two months of the filing date of this present application. The invention is made by a single inventor, so there are no other inventors to be disclosed. This application is not under assignment to any other person or entity at this time.

BACKGROUND OF THE INVENTION

1. Field of the Invention

The present invention relates to a tank holding device and more particularly pertains to a device to hold a tank in an upright position.

2. Description of the Prior Art

The use of devices to hold tanks is known in the prior art. More specifically, devices to hold tanks previously devised and utilized for the purpose of holding tanks are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, the prior art does not describe tank holding device that allows a user to securely hold a tank in an upright position during transport.

In this respect, the tank holding device according to the present invention substantially departs from the conventional concepts and designs of the prior art, and in doing so provides an apparatus primarily developed for the purpose holding a tank in an upright position during transport.

Therefore, it can be appreciated that there exists a continuing need for a new and improved tank holding device which can be used for holding a tank in an upright position during transport or storage. In this regard, the present invention substantially fulfills this need.

SUMMARY OF THE INVENTION

In view of the foregoing disadvantages inherent in the known types of devices to hold tanks now present in the prior art, the present invention provides an improved tank holding device. As such, the general purpose of the present invention, which will be described subsequently in greater detail, is to provide a new and improved tank holding device which has all the advantages of the prior art and none of the disadvantages.

In describing this invention, the word "coupled" is used. By "coupled" is meant that the article or structure referred to is joined, either directly, or indirectly, to another article or structure. By "indirectly joined" is meant that there may be an intervening article or structure imposed between the two articles which are "coupled". "Directly joined" means that the two articles or structures are in contact with one another or are essentially continuous with one another.

By adjacent to a structure is meant that the location is near the identified structure.

To attain the objects and goals of a tank holding device, the present invention essentially comprises a tank holding device, comprising several components, in combination.

There is a base plate. The base plate is fabricated of a rigid material such as plastic or metal. The base plate has a generally rectilinear configuration, with an upper surface and a lower surface, with a thickness there between. The base plate has an edge. The base plate edge is formed by the thickness of the base plate. The base plate has four corners, with each corner having an attachment bolt hole there through. Each attachment bolt hole has an associated attachment bolt. The bolt holes and bolts are configured to allow the base plate to be attached to an existing deck, such as a truck bed. The base plate has a center.

There is a cylinder containment portion. The cylinder containment portion is fabricated of a rigid material. The cylinder containment portion has a generally round cylindrical hollow configuration, with an upper end having a center, and a lower end having a center. The cylinder containment portion has a length between the upper end of the cylinder containment portion and the lower end of the cylinder containment portion. The cylinder containment portion has a centrally located vertical axis. The centrally located vertical axis of the cylinder containment portion runs from the center of the lower end of the containment portion to the center of the upper end of the containment portion. The upper end of the cylinder containment portion has an upper edge. The lower end of the containment portion has a lower edge. The cylinder containment portion has an external surface and an internal surface, with a wall thickness there between. The upper end of the cylinder containment portion has a raised area, with the raised area having a threaded hole there through. The threaded raised area hole of the cylinder containment portion has an associated T shaped bolt. The cylinder containment portion is fixedly coupled to the base plate at the lower edge of the cylinder containment portion lower end and the upper surface of the base plate.

There is a drain hole in the base plate. The drain hole refers to a drain passage and the two words are used interchangeably. The drain passage comprises a first portion and a second portion. The first portion of the drain passage comprises a trough in the upper surface of the base plate. The second portion of the drain passage comprises a notch in the bottom edge of the containment portion. The first portion and the second portion of the drain passage are aligned so as to form the drain hole passageway. The drain hole is centrally located though the drain hole could be located anywhere so as to facilitate the drainage of water from the tank holder system. In a variation, the drain hole may be located at the joining of the cylinder containment portion and the base plate. In this variation the drain hole is angled in a direction toward the axial center of the containment portion and upward toward the upper end of the containment portion. The drain hole passes through the upper surface of the base plate, through the external and internal surfaces of the containment portion, and to the axis of the containment portion. In this variation, the drain hole forms a downwardly and outwardly angled trough for the drainage of condensation. The drain hole trough is directed toward the center of the base plate.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tank holding device which has all of the advantages of the prior art devices to hold tanks and none of the disadvantages.

It is another object of the present invention to provide a new and improved tank holding device which may be easily and efficiently manufactured and marketed.

It is further object of the present invention to provide a new and improved tank holding device which is of durable and reliable constructions.

An even further object of the present invention is to provide a new and improved tank holding device which is susceptible of a low cost of manufacture with regard to both materials and labor, and which accordingly is then susceptible of low prices of sale to the consuming public, thereby making such tank holding device economically available to the buying public.

Even still another object of the present invention is to provide a tank holding device for holding a tank in an upright position during transport or storage.

Lastly, it is an object of the present invention to provide a new and improved tank holding device, comprising a base plate and a cylinder containment portion. The cylinder containment portion being fixedly coupled to the base plate. There is at least one drain hole which is located at the joining of the cylinder containment portion and the base plate. The drain hole is angled upward and inward. The drain hole forms an outwardly and downwardly draining trough.

It should be understood that while the above-stated objects are goals which are sought to be achieved, such objects should not be construed as limiting or diminishing the scope of the claims herein made.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of the tank holding device, with a tank in the containment portion, and the device fixed on an existing truck bed.

FIG. 2 is a view taken along line 2-2 of FIG. 1.

The same reference numerals refer to the same parts throughout the various Figures.

DESCRIPTION OF THE PREFERRED EMBODIMENT

Figure 3:
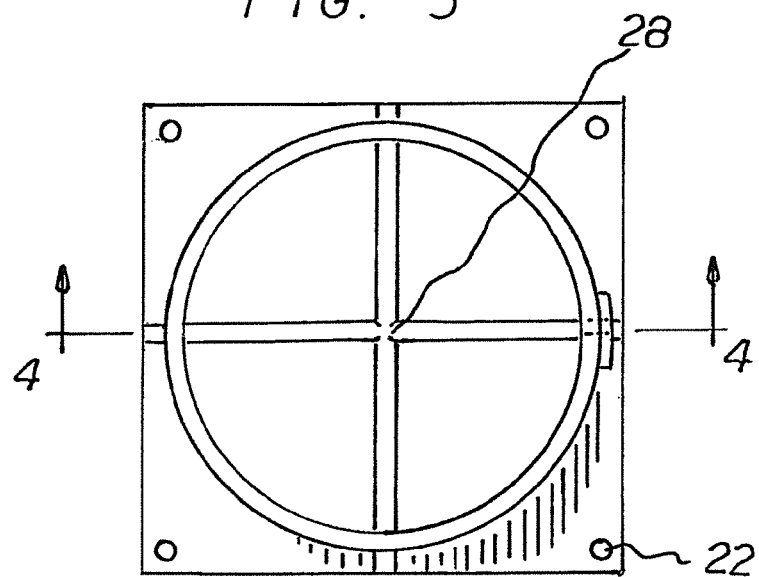
FIG. 3 is a top plan view of the tank holding device. Note the center of the base plate and the center of the containment portion are generally aligned.
Figure 4:
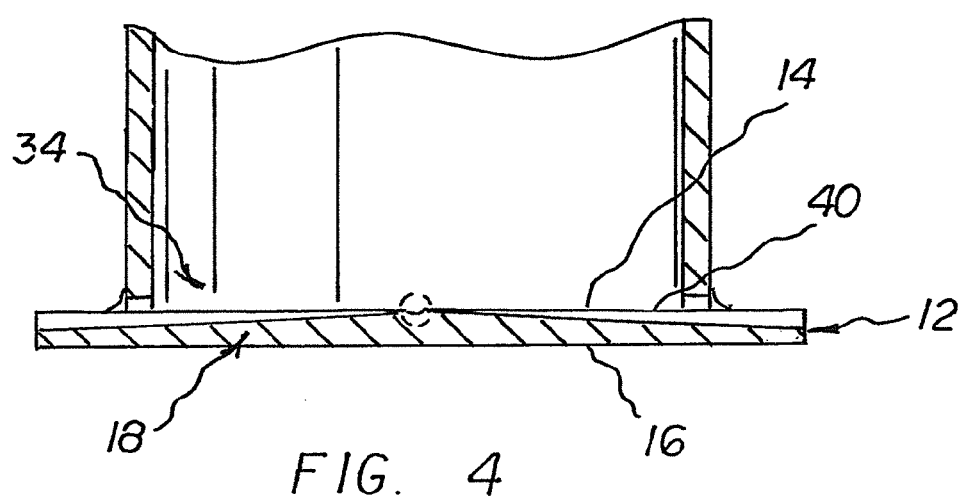
FIG. 4 is a close up cross section view of the joining of the base plate and the containment portion. Note the downwardly angled troughs which are drilled through the edge of the base plate and the containment portion, letting water flow away from the center of the containment portion.
Figure 5:
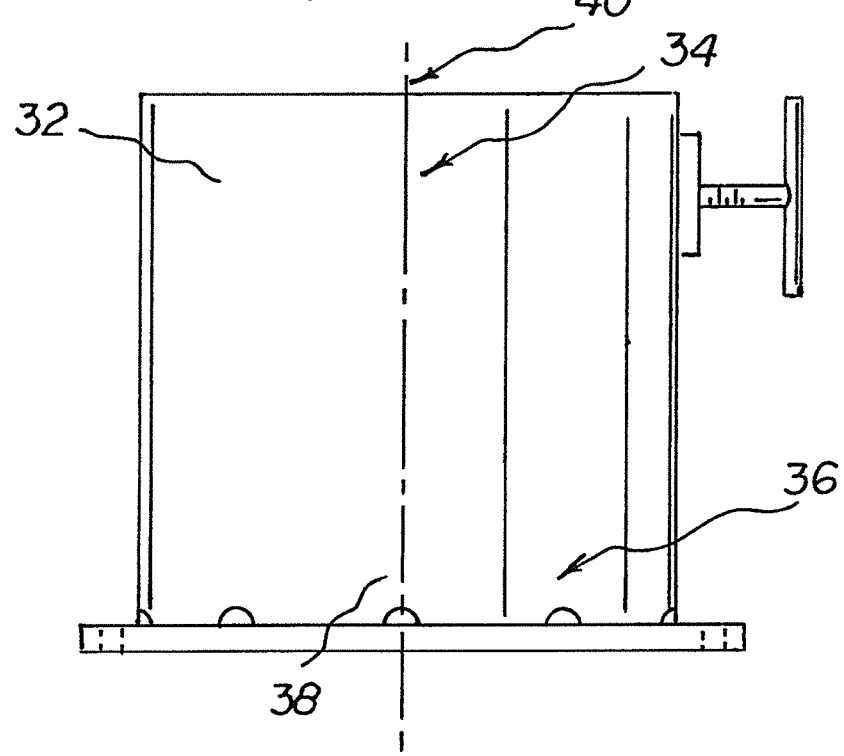
FIG. 5 is a side elevational view of the tank holding device. Note the plurality of holes at the juncture of the containment portion and the base plate.
Figure 6:
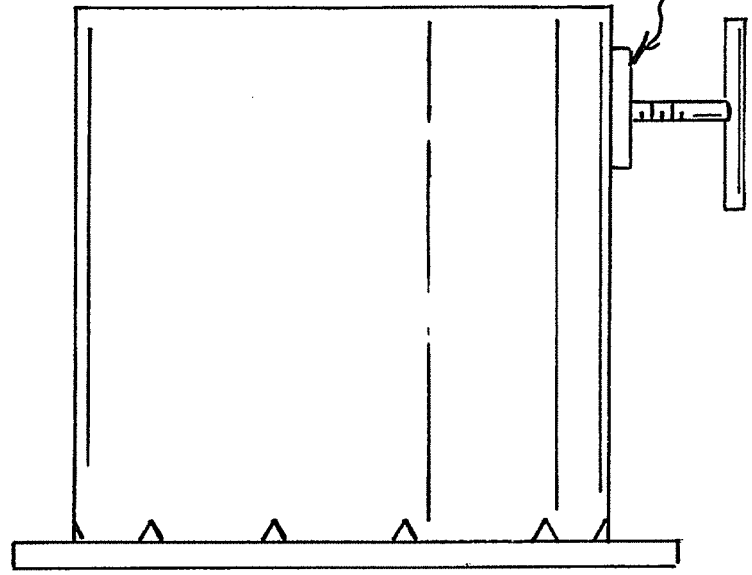
FIG. 6 is a side elevational view of the tank holding device, showing notches cut into the side of the containment portion. In this variation there is not trough cut in the base plate.

With reference now to the drawings, and in particular to FIG. 1 thereof, the preferred embodiment of the new and improved tank holding device embodying the principles and concepts of the present invention and generally designated by the reference numeral 10 will be described.

The present invention, the tank holding device 10 is comprised of a plurality of components. Such components in their broadest context include a base plat, a containment portion, and a T shaped bolt. Such components are individually configured and correlated with respect to each other so as to attain the desired objective.

A tank holding device 10, comprising several components, in combination, is described.

There is a base plate 12. The base plate is fabricated of a rigid material such as plastic or metal. The base plate has a generally rectilinear configuration, with a generally flat upper surface 14 and a generally flat lower surface 16, with a thickness there between. The base plate has an edge 18. The base plate edge is formed by the thickness of the base plate. The base plate has four corners 20, with each corner having an attachment bolt hole 22 there through. Each attachment bolt hole has an associated attachment bolt 24. The bolt holes and bolts are configured to allow the base plate to be attached to an existing deck 26, such as a truck bed. The base plate has a center 28.

There is a cylinder containment portion 30. The cylinder containment portion is fabricated of a rigid material. The cylinder containment portion has a generally round cylindrical hollow configuration, with an upper end 32 having a center 34, and a lower end 36 having a center 38. The cylinder containment portion has an internal diameter. The internal diameter is continuous. The cylinder containment portion has a length between the upper end of the cylinder containment portion and the lower end of the cylinder containment portion. The cylinder containment portion has a centrally located vertical axis 40. The centrally located vertical axis of the cylinder containment portion runs from the center of the lower end of the containment portion to the center of the upper end of the containment portion. The upper end of the cylinder containment portion has an upper edge 42. The lower end of the containment portion has a lower edge 44. The cylinder containment portion has an external surface 46 and an internal surface 48, with a wall thickness there between. The upper end of the cylinder containment portion has a raised area 50, with the raised area having a threaded hole 52 there through. The threaded raised area hole of the cylinder containment portion has an associated T shaped bolt 54. The cylinder containment portion is fixedly coupled to the base plate at the lower edge of the cylinder containment portion lower end and the upper surface of the base plate. Fixed coupling may be obtained by a weldment, adhesion, or heat welding. The tank holding device may be continuous, that is, it may be made of billet material, being a continuous piece.

There is a drain hole 56. The drain hole is located in the general center of the base plate, but it may be located in any position so as to facilitate drainage of condensation which may accumulate on the tank surface. The drain hole is located parallel with the axis of the containment portion.

In a variation, the drain hole may be located at the joining of the cylinder containment portion and the base plate. In this variation, the drain hole is angled in a direction toward the axial center of the containment portion and upward toward the upper end of the containment portion. In this variation, the drain hole passes through the upper surface of the base plate, through the external and internal surfaces of the containment portion, and to the axis of the containment portion. In this variation, the drain hole forms a downwardly and outwardly angled trough 58 for the drainage of condensation and is in an intersecting plane with the axis of the containment portion. The drain hole trough is directed toward the center of the base plate.

Figure 7:
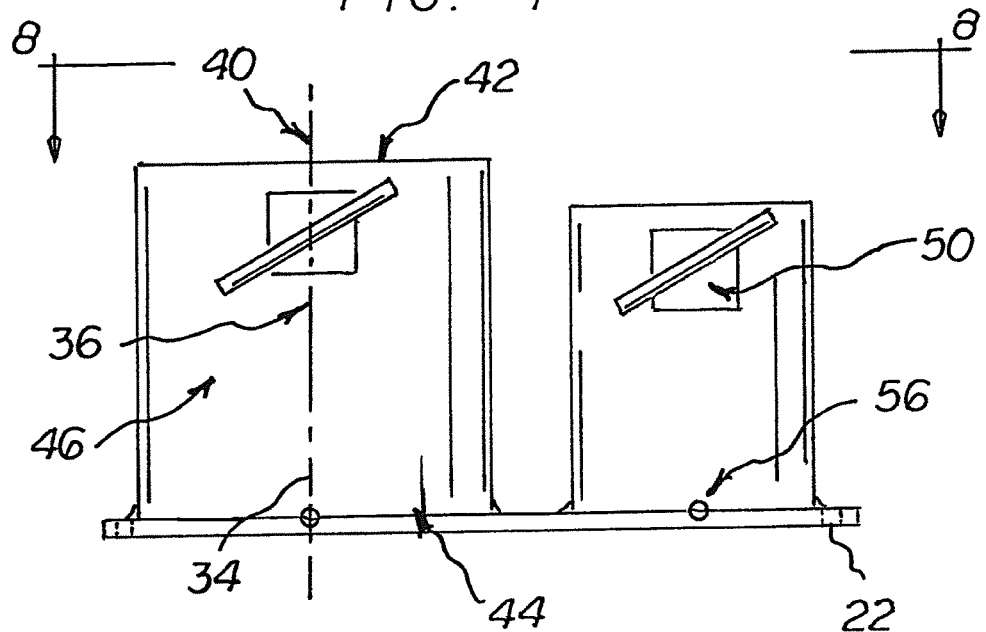
FIG. 7 is a side elevational view of multiple containment portions being joined to a base plate. This variation allows the user to carry more than one tank, or more than one size of tank, using the same device.
Figure 8:
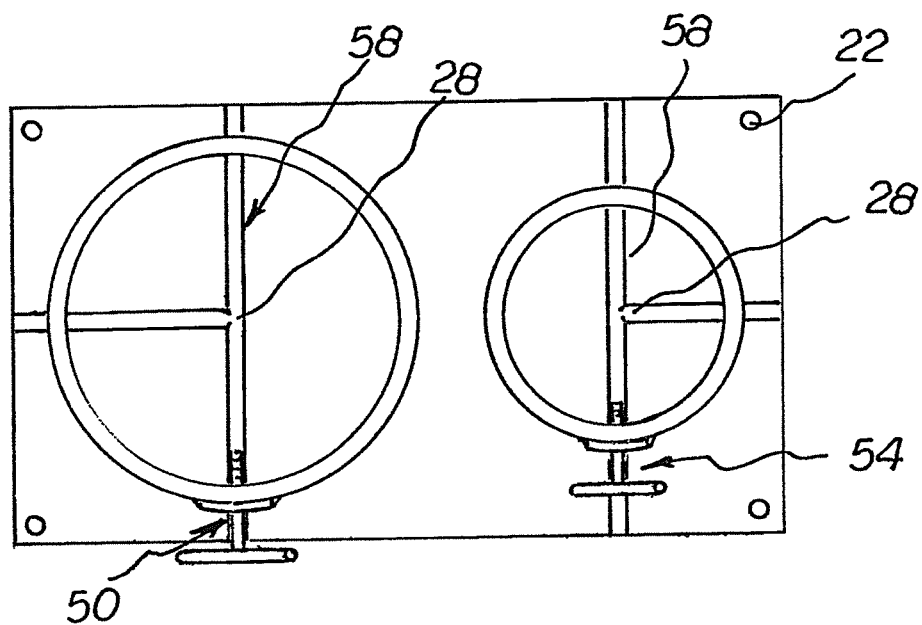
FIG. 8 is a view taken along line 8-8 of FIG. 7. Note the troughs which are drilled into the base plate edge and containment portion.

There are variations of the tank holding device which are herein described. In one variation, there are more than one tank holding containment portions affixed to the base plate. The containment portions may each have a different internal diameter. As shown in FIGS. 7 and 8, there are two different internal diameters in the tank containment portions. Also to be noted is that the variation having more than one tank containment portion requires that there is no drain hole from the innermost side of the containment portions, in that the affixing of the tank containment portion prevents a long drill from passing through that side of the tank containment portion.

This situation may be rectified by the cutting of the drain hole in the base plate, or, in a variation, the making of the trough prior to attachment. The drain hole is angled so that condensation which might accumulate within the tank containment portion may be drained away, to the outside of the containment portion, thereby decreasing the occurrence of rust within the confines of the tank containment portion.

In practice, the tank holding device is fixedly attached to a deck, such as a truck bed, by using bolts passing through the base plate and through the truck bed. The tank is then placed in the containment portion, and the T-shaped bolt is turned inward, locking the tank within the containment portion.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tank holding device, comprising, in combination:
a base plate;
a cylinder containment being coupled to the base plate; and
a drain passage located at the joining of the cylinder containment portion and the base plate, the drain passage comprising a first portion and a second portion with the first portion of the drain passage comprising a trough in the upper surface of the base plate with the second portion of the drain passage comprising a notch in the bottom edge of the containment portion with the first portion and the second portion of the drain passage being aligned so as to form the drain hole passageway, the drain passage being angled upward and inward, the drain passage forming an outwardly and downwardly draining trough.

2. The tank holding device as described in claim 1, with the device further comprising the base plate having an edge, the base plate having a center, with the trough running from the edge of the base plate toward the center of the base plate.

3. The tank holding device as described in claim 1, with the device further comprising the drain passage being angled in a direction toward the axial center of the containment portion and upward toward the upper end of the containment portion.

4. A tank holding device, comprising, in combination:
a base plate having a generally rectilinear configuration with an upper surface and a lower surface with a thickness there between, the base plate having an edge formed by the thickness of the base plate, the base plate having four corners, the base plate having a center;
a cylinder containment portion having a generally round cylindrical hollow configuration with an upper end having a center, and a lower end having a center, with a length there between, the cylinder containment portion having a centrally located vertical axis, the axis running from the center of the lower end of the containment portion to the center of the upper end of the containment portion, the upper end of the containment having an upper edge and the lower end of the containment portion having a lower edge, the cylinder containment portion having an external surface and an internal surface with a wall thickness there between, the cylinder containment portion being fixedly coupled to the base plate; and
a drain passage comprising a trough in the upper surface of the base plate and a through notch in the bottom edge of the containment portion with the notch and the trough being in alignment, the drain passage also passing through the external and internal surfaces of the containment portion.

5. The tank holding device as described in claim 4, with the device further comprising:

each corner of the base plate having an attachment bolt hole there through; and the upper end of the cylinder containment portion having a raised area.

6. The tank holding device as described in claim 5, with the device further comprising:

each base plate corner attachment bolt hole having an associated attachment bolt, the base plate bolt holes and bolts being configured to allow the base plate to be attached to an existing deck; and the raised area of the cylinder containment portion having a threaded hole there through.

7. The tank holding device as described in claim 6, with the device further comprising the cylinder containment portion threaded raised area hole having an associated T shaped bolt, the cylinder containment portion being fixedly coupled to the base plate at the lower edge of the cylinder containment portion lower end and the upper surface of the base plate.

8. The tank holding device as described in claim 7, with the device further comprising:

the base plate being fabricated of a rigid material; and the cylinder containment portion being fabricated of a rigid material.

* * * * *